Patented Feb. 19, 1946

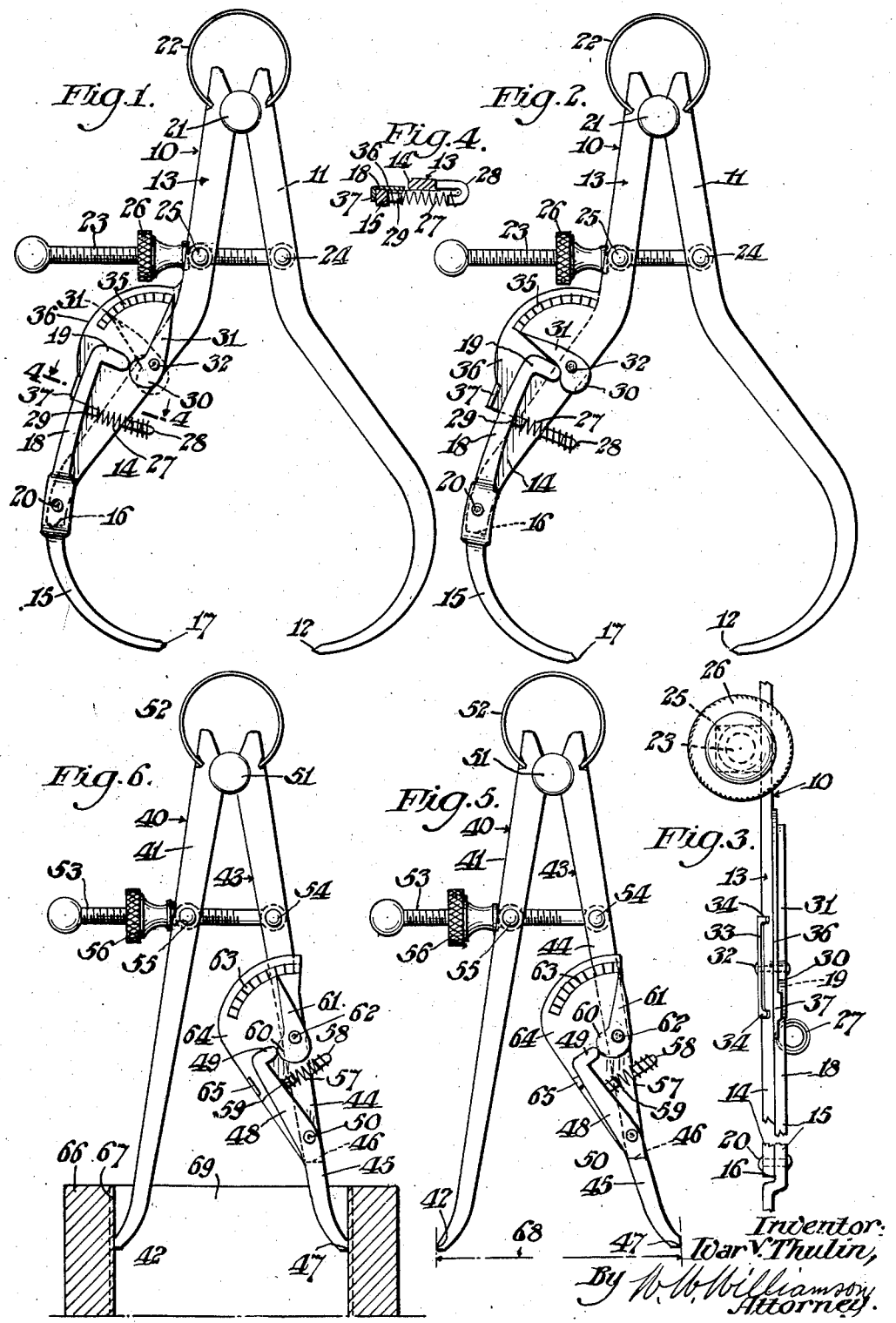

2,395,154

UNITED STATES PATENT OFFICE 2,395,154

COMBINATION INDICATING CALIPERS

Ivar V. Thulin, Upper Darby, Pa.

Application November 16, 1943, Serial No. 510,564

6 Claims. (Cl. 33—148)

My invention relates to new and useful combination indicating calipers and has for one of its objects to provide an instrument of this character that primarily may be adjusted to a desired measurement and thereafter other limited secondary measurements may be taken and indicated without changing, except temporarily, the desired, original or primary measurement.

Another object of this invention is to provide a tool of the kind mentioned including a pointer actuated directly by one section of a two-piece leg thereby eliminating the possibility of lost motion caused by intermediate elements.

Another object of the present invention is to provide an exceedingly simple and effective tool for accurately indicating a variance in size relative to a predetermined wanted size measured by the tool.

Another object of the invention is to construct outside calipers which can be used on work in motion, without the possibility of said calipers sticking on the work and damaging either said work or the calipers, or injuring the worker, to obtain a measurement of the variance between the setting of the calipers and the test measurement taken.

A further object of the invention is to provide inside calipers that may be adjusted or set to a predetermined or desired inside measurement and then other measurements of less dimensions taken which will indicate the difference between the two measurements without effecting the setting of the calipers, except temporarily.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which:

Fig. 1 is a side elevation of the outside calipers illustrating them in a set position to a predetermined measurement and showing in dotted lines the position of the pointer after a test or secondary measurement has been taken.

Fig. 2 is a similar view of the same calipers illustrating the positions of the several elements as a test measurement is taken.

Fig. 3 is an enlarged fragmentary edge view thereof.

Fig. 4 is a section on the line 4—4 of Fig. 1.

Fig. 5 is a side elevation of the inside calipers illustrating them in a set position to a predetermined or desired measurement.

Fig. 6 is a similar view showing the same calipers in use for taking a secondary measurement.

In carrying out my invention as herein embodied, particular reference first being had to Figs. 1 to 4, 10 represents a pair of outside calipers including a leg 11 constructed as an integral unit with a curved lower end terminating in a toe 12. The companion leg 13 comprises two sections 14 and 15, the upper section 14 being of the same general shape as the major portion of the leg 11 but ending short thereof, as at 16, while the lower section includes the curved portion terminating in the toe 17 and a shank 18 having a nose 19 projecting from the inner edge thereof at the top end.

The lower section 15 is pivoted intermediate its ends, as at 20, to the lower end of the upper section 14 and the curved portion of said lower section 15 is in line with said upper section 14 but the shank portion 18 of said lower section 15 is offset laterally relative to the curved portion, Fig. 3, so as to be imposed upon a face of the upper section 14.

The two legs 11 and 13 are hinged or fulcrumed on the joint element 21 and their lower or toe ends are urged apart by a spring ring 22 which is a common construction in calipers. The spread of said legs is regulated by an adjusting mechanism which, for purposes of illustration, is shown as a screw or threaded rod 23 having an end fixed to a post 24 pivoted to the leg 11 and loosely projecting through a post 25 pivoted to the upper section 14 of the other leg 13 and having an adjusting nut 26 mounted on said threaded rod and engaging the post 25.

The lower section 15 of the two-piece leg 13 is held under tension to urge the toe 17 towards the toe 12 by a spring 27 which, for purposes of illustration, is shown as of the coil type having one end mounted on a hook shaped pin 28 carried by and projecting from the inner edge of the upper section 14. The other end of said spring bears against an edge of the shank 18 of the lower section 15 and is held in position by a pin 29 projecting from the shank edge.

The nose 19 engages or merely contacts the rounded heel 30 of a pointer 31 pivoted at 32 to the upper section 14 of the leg 13. The pivot is above the point of contact of the nose with the pointer heel and said pivot is held under resilient tension by a flat spring 33, Fig. 3, through which said pivot passes and said spring engages the face of the leg 13 opposite the one on which the pointer is mounted. Portions of the spring 33, such as fingers 34 bent up out of the spring material at opposite ends, engage an edge of the leg 13 to prevent shifting of said spring. This produces sufficient friction between the pivot, pointer and leg to hold said pointer at any set position under all ordinary circumstances.

The pointer 31 coacts with graduations 35 on a dial 36 carried by and projecting from the outer edge of the upper section 14 of the leg 13 and said dial has a stop 37 thereon to limit the movements of the lower section 15 of said leg 13 as said lower section is actuated by a spring 27. The graduations may represent any preselected degrees of measurement according to the spaces between them and all or certain ones of them may be numbered to assist the operator in quickly ascertaining the measurement indicated.

In practice, the calipers may be first set to a measurement desired, as shown in Fig. 1, by properly manipulating the adjusting apparatus consisting, primarily, of the threaded rod 23 and nut 26 and using a rule, micrometers, gauge or a finished piece of work, until the toes 12 and 17 are the desired distance apart. During the adjustment the operator must make sure that the lower leg section 15 does not move against the action of the spring 27.

Assume a piece of work on a lathe is being turned down to a given diameter represented by the setting of the calipers as shown in Fig. 1. Without stopping the machine, the calipers may be caused to straddle the work by merely pushing the legs over the work. As soon as this has been done the calipers may be immediately withdrawn. So long as the work being calipered is larger than the finished product desired, the lower section 15 of the leg 13 will be moved to some new position, as suggested by the showing in Fig. 2. This will cause the nose 19 to move the pointer 31 which will indicate on the graduations 35 the variation between the desired or wanted size and the oversize part of the work measured. As the calipers are withdrawn from the work piece, the spring 27 will return the lower leg section 15 to its former position, being arrested by the stop 37, but the pointer 31 will remain in the indicating position as suggested by the dotted line location in Fig. 1. The operator may now read the measurement obtained and set his machine for an additional cut or cuts. Before taking another test measurement the pointer should be returned to its neutral or zero position by manually forcing said pointer back until the heel 30 again engages the nose 19. From the foregoing it will be apparent that when the calipers are removed from the work the measurement reading will be preserved until the pointer is reset, even though the caliper legs return to their former spacing.

A secondary result accrues from the structure in that the calipers cannot firmly grip the work, because of the resilient mounting of the lower leg section, therefore said calipers will not be pulled from the hand of the operator and the possibility of damage to the calipers or the machine, or injury to the operator is eliminated.

The inside calipers 40, Figs. 5 and 6, are practically the same as the outside calipers except that the dial and associated parts are on the inside of a leg instead of the outside so as not to be in the way when measurements are being taken. Said inside calipers includes a leg 41 constructed as an integral unit with an outwardly curved lower end terminating in a toe 42. The companion leg 43 comprises two sections 44 and 45, the upper section being straight like the other leg, but ending short of the latter, as at 46, while the lower section includes the outwardly curved portion terminating in the toe 47 and a shank 48 having a nose 49 projecting from the outer edge thereof at the top end.

The lower section 45 is pivoted intermediate its ends, as at 50, to the lower end of the upper section 44 and the curved portion of said lower section 45 is in line with said upper section 44 but the shank portion 48 of said lower section 45 is offset laterally relative to the toe portion so as to be imposed upon a face of the upper section 44.

The two legs 41 and 43 are fulcrumed on the joint element 51 and their toe ends are urged apart by a spring ring 52. The spread of said legs is regulated by an adjusting mechanism consisting of a threaded rod 53 having an end fixed to a post 54 pivoted to the leg 41 and loosely projecting through a post 55 pivoted to the upper leg section 44 of the leg 43 and having an adjusting nut 56 mounted on said threaded rod and engaging the post 55.

The lower section 45 of the two-piece leg 43 is held under tension to urge the toe 47 towards the toe 42 by a spring 57 which is shown as of the coil type having one end mounted on a hook shaped pin 58 carried by and projecting from the outer edge of the upper section 44. The other end of said spring bears against an edge of the shank 48 of the lower section 45 and is held in position by a pin 59 projecting from the shank edge.

The nose 59 engages or merely contacts the rounded heel 60 of a pointer 61 pivoted at 62 to the upper section 44 of the leg 43. The pivot is above the point of contact of the nose with the pointer heel and said pivot is held under resilient tension in the same manner as described in connection with the outside calipers.

The pointer coacts with graduations 63 on a dial 64 carried by and projecting from the inner edge of the upper section 44 of the leg 43 and said dial has a stop 65 thereon to limit the movements of the lower leg section 45 as the latter is actuated by the spring 57. The graduations may be numbered and represent any preselected degrees of measurement according to the spaces between them.

In using the inside calipers, it will be assumed that a hole is to be formed in a piece of work 66 to the size indicated by the dotted lines 67 in Fig. 6 which is the same size as the space indicated by the broken arrows 68, Fig. 5. The hole might be bored undersize and thereafter reamed to the finished size and for this reason several test measurements might be necessary.

The calipers are first set to a desired or preselected measurement, as shown in Fig. 5, by properly manipulating the adjusting apparatus. To make a test measurement the caliper legs are pressed toward each other and the toe ends inserted in the hole 69. Upon release of the caliper legs they will spread until the toes engage the walls of the piece of work, as in Fig. 6. The pressing of the legs towards each other may have moved the pointer 61 a greater distance than necessary so that while the toes are in engagement with the walls of the piece of work said pointer is moved back until the heel 60 of said pointer engages the nose 49 thus indicating the proper measurement of any variance between the desired size and the size of the hole at the time of making the test. After the test measurement has been made the calipers may be withdrawn and the pointer will remain in the indicating position until another measurement is to be made.

Of course I do not wish to be limited to the exact details of construction herein shown and described as these may be varied within the scope of the appended claims without departing from the spirit of my invention.

Having described my invention what I claim as new and useful is:

1. Combination indicating calipers comprising a one-piece leg, a two-piece leg, said legs being hingedly connected together, said two-piece leg including an upper section and a lower section pivoted intermediate its ends to the bottom end of the upper section, a pointer pivoted to said upper leg section and having a heel portion with the pivot above the top end of the lower leg section which top end contacts one side of the heel of said pointer, said pointer being frictionally held by its pivot so as to remain in any position, means to urge the top end of said lower leg section away from the pointer, and a scale having graduations with which the pointer coacts.

2. The structure in claim 1 wherein said friction is provided by resilient means acting upon the pointer.

3. Combination indicating calipers comprising a one-piece leg and a two-piece leg hinged at their upper ends, means to urge their lower ends apart, means to set them at any desired adjustment, said two-piece leg including an upper section and a lower section pivoted intermediate its end to the bottom end of the upper section so that said lower section consists of a toe end and a shank, and a pointer pivoted to the upper leg section above the shank of the lower leg section and including a heel portion having one side thereof in the path of travel of the top end of said shank, said pointer being frictionally held by its pivot so as to remain in any position.

4. The structure in claim 3 wherein the pointer heel portion which is contacted by the lower leg section is rounded convexly and the shank of the lower leg section has a nose projecting from the edge thereof at the top end to engage one side of the pointer heel portion.

5. In a pair of combination indicating calipers, a two piece leg consisting of an upper section, a lower section comprising a toe end and a shank, said shank offset laterally a distance approximating the thickness of the upper leg section and on which said shank is imposed with the toe end in the same plane as the upper leg section, means to pivot said lower section intermediate its ends to an end of the upper leg section, a pointer, and means to pivot said pointer intermediate its ends with the pivot point above the top end of the shank, the part of the pointer below the pivot point constituting a heel portion in the path of travel of said top end of the shank, said pointer being frictionally held by its pivot so as to remain in any position.

6. The structure in claim 5, in combination with means to urge the top end of the shank away from the pointer.

IVAR V. THULIN.